United States Patent [19]

Ohkawa et al.

[11] Patent Number: 4,959,442

[45] Date of Patent: Sep. 25, 1990

[54] PHOSPHAZENE ARTICLE AND PROCESS FOR PRODUCING THE SAME

[75] Inventors: Kazumi Ohkawa, Kashiwara; Toshitsugu Matsuki, Matsuyama; Noritsugu Saiki, Matsuyama, all of Japan

[73] Assignee: Teijin Limited, Osaka, Japan

[21] Appl. No.: 421,305

[22] Filed: Oct. 12, 1989

Related U.S. Application Data

[63] Continuation of Ser. No. 40,485, Apr. 20, 1987, abandoned.

[51] Int. Cl.⁵ .............................................. C08G 79/02
[52] U.S. Cl. .................................. 528/168; 528/399; 525/534; 525/538
[58] Field of Search ................. 525/538, 534; 528/168, 528/399

[56] References Cited

U.S. PATENT DOCUMENTS 4,292,418 9/1981 Joung .................................... 525/538
4,311,736 1/1982 Leong .................................... 528/399

FOREIGN PATENT DOCUMENTS 60-87829 5/1985 Japan .
60-156505 8/1985 Japan .

OTHER PUBLICATIONS

"Macromolecules", vol. 5, No. 2, pp. 231–232 (1972).

*Primary Examiner*—John Kight, III
*Assistant Examiner*—Anang Sridharan
*Attorney, Agent, or Firm*—Burgess, Ryan & Wayne

[57] ABSTRACT

A shaped polyphosphazene article having a modified surface portion thereof and exhibiting a desired property and/or performance comprises a polyphosphazene polymer having at least 50 molar % or more of repeating units of the formula (I):

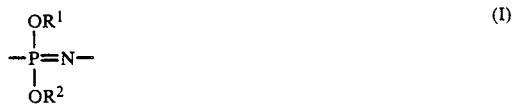

(I)

wherein $R^1$ and $R^2$ in the first and second side chains —$OR^1$ and —$OR^2$ respectively represent, independently from each other, an aliphatic, cycloaliphatic or aromatic radical, and having at least a portion of a surface portion thereof in which at least 5 molar % of the first and second side chains are converted to one or more types of third side chains —$OR^3$ wherein $R^3$ represents an aliphatic, cycloaliphatic or aromatic radical and which are different from —$OR^1$ and —$OR^2$.

12 Claims, No Drawings

PHOSPHAZENE ARTICLE AND PROCESS FOR PRODUCING THE SAME

This application is a continuation, of application Ser. No. 040,485, filed 4/20/87, now abandoned.

BACKGROUND OF THE INVENTION

(1) Field of the Invention

The present invention relates to a shaped polyphosphazene article and a process for producing the same. More particularly, the present invention relates to a shaped polyphosphazene article having a surface portion thereof modified without degrading the inherent properties of the phosphazene polymer and having improved surface properties, and a process which can be utilized industrially for producing the same.

(2) Description of the Related Art

It is known that a polyphosphazene is an elastomer having a backbone chain consisting of phosphorus and nitrogen atoms and not containing a carbon atom, and therefore, exhibiting an excellent heat resistance and chemical resistance. The polyphosphazene polymer can be shaped into desired shapes, for example, a sheet, a film, a wire, and a filament, as disclosed in Japanese Unexamined Patent Publication Nos. 60-87,829 and 60-156,505.

Attempts have been made to provide a polyphosphazene polymer having an enhanced abrasion resistance, oxidation-resistance or affinity to living organisms by attaching a specific type of side chains to the backbone chain of the polymer. However, the attempted polyphosphazene polymers sometimes exhibit disadvantageous properties, for example, a degraded stability during the shaping procedure, or a deteriorated chemical property, physical property and/or dynamic property.

It is also known from "Macromolecules", Vol. 5, No. 2, page 231, 1972, that all or some of the side chains in a polyphosphazene polymer can be converted to a different type of side chains by heat treating the polyphosphazene polymer in a solution containing a compound capable of imparting the different type of the side chains. However, the resultant modified phosphazene polymer has the same disadvantages as those mentioned above.

SUMMARY OF THE INVENTION

An object of the present invention is to provide a shaped phosphazene article having an excellent heat-stability and shaping property, satisfactory chemical, physical and mechanical properties, and specific surface property, and a process for producing the same.

Another object of the present invention is to provide a shaped phosphazene article having a specifically modified surface portion and exhibiting a specific surface performance, and a process for producing the same by specifically modifying the desired portion of a surface portion of a precursory shaped polyphosphazene article.

The above-mentioned objects can be attained by the shaped polyphosphazene article of the present invention which comprises a polyphosphazene polymer having at least one type of repeating units of the formula (I):

(I)

wherein $R^1$ and $R^2$ in the first and second side chains $-OR^1$ and $-OR^2$ respectively represent, independently from each other, a member selected from the group consisting of unsubstituted and substituted aliphatic, cycloaliphatic, and aromatic radicals, and has at least a portion of a surface portion thereof in which at least 5 molar% of the first and second side chains in the polyphosphazene polymer are converted to at least one type of third side chains of the formula $-OR^3$ in which $R^3$ represents a member selected from unsubstituted and substituted aliphatic and aromatic radicals and which are different from the first and second side chains 13 $OR^1$ and $-OR^2$.

The above-mentioned specific shaped polyphosphazene article can be produced by the process of the present invention which comprises the steps of:

shaping a polyphosphazene polymer having at least one type of repeating units of the formula (I):

(I)

wherein $R^1$ and $R^2$ in the first and second side chains $-OR^1$ and $-OR^2$ respectively represent, independently from each other, a member selected from the group consisting of unsubstituted and substituted aliphatic, cycloaliphatic, and aromatic hydrocarbon radicals, into a desired shape to provide a precursory shaped article; and surface treating at least a portion of a surface portion of the precursory shaped article with a surface treating agent consisting of at least one compound of the formula (II):

(II)

wherein M represents a member selected from alkali metals and alkaline earth metals and $R^3$ represents a member selected from unsubstituted and substituted aliphatic and aromatic hydrocarbon radicals and different from those represented by $R^1$ and $R^2$ in the formula (I), to an extent such that at least 5 molar% of the first and second side chains $-OR^1$ and $-OR^2$ in the polymer in the above-mentioned polymer of the precursory shaped article are converted to at least one type of third side chains of the formula $-OR^3$ different from the first and second side chains $-OR^1$ and $-OR^2$.

DESCRIPTION OF THE PREFERRED EMBODIMENTS

In the process of the present invention, a precursory shaped article is produced from a specific polyphosphazene polymer having at least one type of repeating units of the formula (I):

   (I)

In the polymer of the formula (I), first and second side chains —OR$^1$ and —OR$^2$ are attached to a phosphorus atom in a backbone chain represented by the formula —P=N—. In the formula (I), R$^1$ and R$^2$ respectively represent, independently from each other, a member selected from aliphatic, cycloaliphatic, and aromatic radicals.

The aliphatic radicals represented by R$^1$ and R$^2$ are preferably selected from unsubstituted and substituted aliphatic hydrocarbon radicals having 1 to 12 carbon atoms.

The aromatic radicals represented by R$^1$ and R$^2$ are preferably selected from unsubstituted and substituted aromatic hydrocarbon radicals having 6 to 24 carbon atoms.

The polyphosphazene polymer having the repeating units of the formula (I) can be prepared by a known synthetic process, for example, as disclosed in "SENI TO KOGYO", Vol. 38, No. 8, pages 397 to 404, 1982, and "Fine Chemical", Vol. 14, No. 6, pages 22 to 34, 1985.

For example, a polyphosphazene polymer is produced in accordance with the following process.

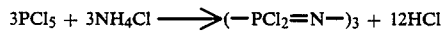

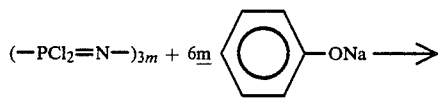
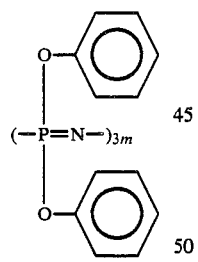

In the above equations, m represents an integer of 1 or more.

The polyphosphazene polymer usable for the present invention may be a polyphosphazene homopolymer consisting of a single type of repeating units of the formula (I) alone or may be a polyphosphazene copolymer consisting of two or more different types of repeating units of the formula (I) alone or of one or more types of repeating units of the formula (I) and at least one type of repeating units different from those of the formula (I), as long as they have satisfactory chemical, physical and mechanical properties, and reaction properties.

In the polyphosphazene copolymer containing the different type of repeating units, the at least one type of repeating units of the formula (I) is preferably in a content of 50 molar% or more, more preferably 70 molar% or more, still more preferably 80 molar% or more. That is, the different type of repeating units from those of the formula (I) are preferably in a content of 50 molar% or less, more preferably 30 molar% or less, still more preferably 20 molar% or less.

If the content of the repeating units of the formula (I) is less than 70 molar%, the resultant shaped polyphosphazene article sometimes exhibits unsatisfactory mechanical and thermal properties.

The polyphosphazene polymer usable for the present invention may be a blend of 70% by weight or more of a polyphosphazene homopolymer with 30% by weight of at least one other polymer, for example, a polyester, such as polyethylene terephthalate, polybutylene terephthalate or polyhexamethylene terephthalate; a polyamide, for example, nylon 6, nylon 66, poly-m-phenylene isophthalamide, poly-m-phenylene terephthalamide or poly-p-phenylene terephthalamide; a polyolefine, for example, polyethylene or polypropylene; a polycarbonate or a polyphenylene sulfide.

The polyphosphazene polymer usable for the present invention preferably has a molecular weight of 50,000 or more, more preferably 100,000 or more. If the molecular weight is smaller than 50,000, the resultant shaped article sometimes exhibits unsatisfactory mechanical properties.

An example of the preferable polyphosphazene polymers of the present invention consists of 50 to 100 molar% of at least one type of phosphazene repeating units of the formula (I) in which the radicals R$^1$ and R$^2$ are selected from the group consisting of:

(i) aliphatic and cycloaliphatic hydrocarbon radicals having 1 to 12 carbon atoms, which are optionally substituted by at least one fluorine atom; and (ii) unsubstituted and substituted aromatic hydrocarbon radicals of the formulae:

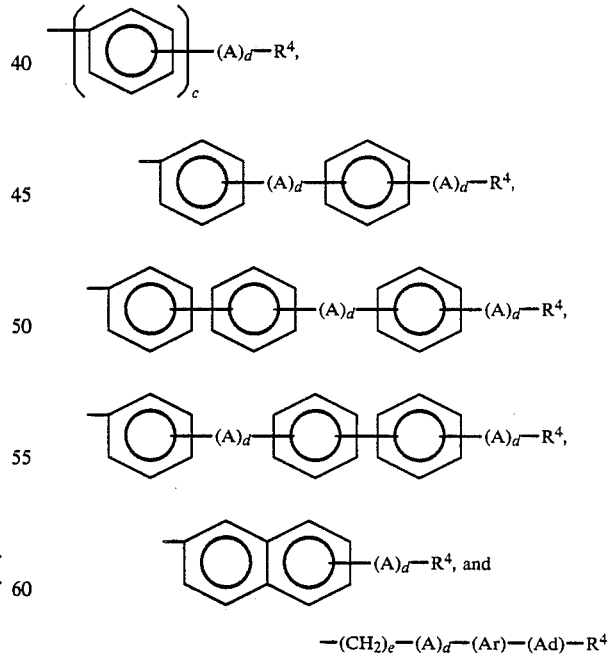

$$-(CH_2)_e-(A)_d-(Ar)-(Ad)-R^4$$

wherein R$^4$ represents a member selected from the group consisting of a hydrogen atom, halogen atoms, —CN radical, primary alkyl radicals having 1 to 12 carbon atoms, secondary alkyl radicals having 3 to 14 carbon atoms, α,α-dimethyl alkyl radicals having 4 to 14 carbon atoms, and unsaturated aliphatic hydrocarbon radicals having 2 to 6 carbon atoms, for example, —CH=CH₂, and —CH₂—CH=CH₂, which radicals optionally contain at least one hetero atom selected from oxygen and sulfur atoms; Ar' represents a member selected from aromatic radicals of the formulae:

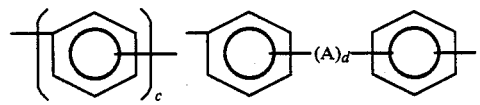

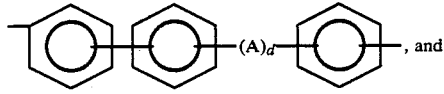

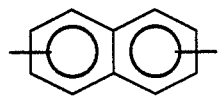

A represents a member selected from oxygen and sulfur atoms; d represents zero or an integer of one; c represents an integar of 1 to 3; e represents an integer of 1 to 4, and in the group represented by —(A)$_d$—R⁴ in the above-indicated formulae, R⁴ may be —CN or a halogen atom only when d is zero.

Examples of preferable substituted aliphatic hydrocarbon radicals represented by R¹ and R² are

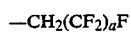

and

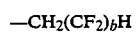

wherein a and b respectively represent an integar of 1 to 11. That is, examples of the preferable phosphazene repeating units are those of the formulae:

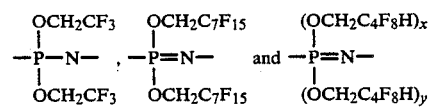

wherein x+y=2.

Example of the preferable aromatic phosphazene repeating units of the formula (I) are those of the formulae:

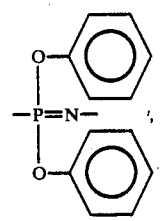 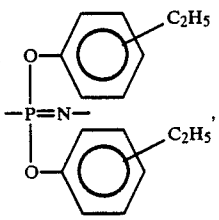

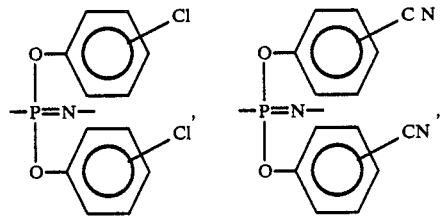

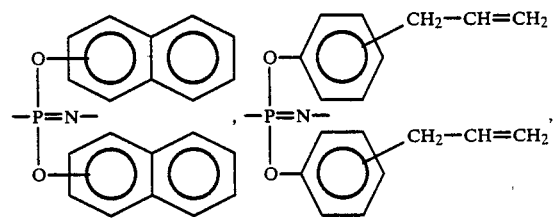

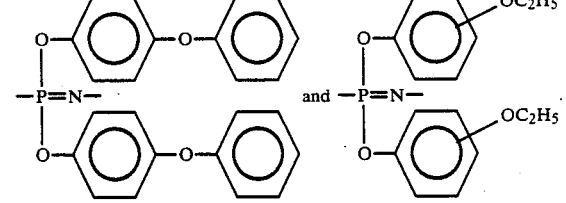

Still other example of the preferable aromatic phosphazene repeating unit of the formula (I) are those of the formulae:

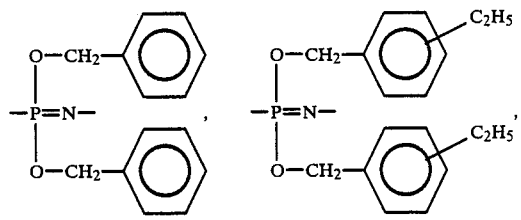

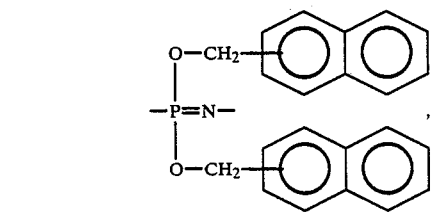

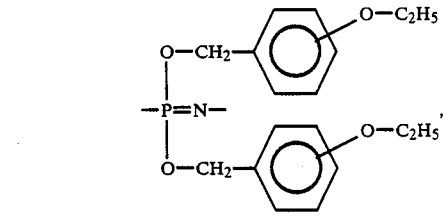

-continued

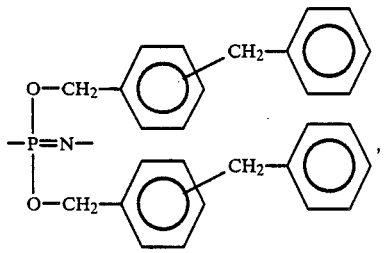

,

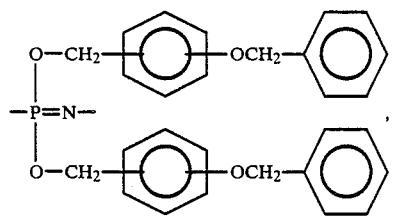

,

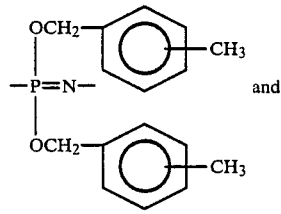 and

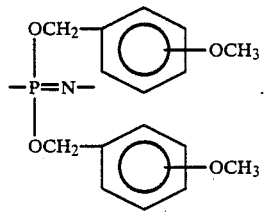

The most preferable phosphazene repeating units of the formula (I) are as follows.

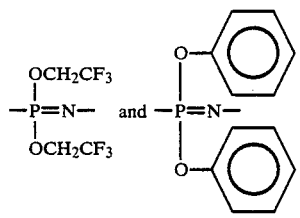

The shaped polyphosphazene article may be in any desired form, for example, in the form of a film, wire, filament, bar, rod, sheet, cylinder, pipe, tube, bottle or other complicated shape.

The specific polyphosphazene polymer is shaped into a precursory shaped article having a desired shape and dimensions by a known shaping or molding method. For example, a precursory filament, wire or film is produced by extruding a high concentration dope solution of a polyphosphazene polymer in a solvent through a filament, wire or film-forming nozzle (orifice or slit) and then solidifying the extruded polymer stream by coagulation or evaporation of the solvent.

The dope solution may be spread on a smooth surface of a substrate, for example, a flat horizontal glass or metal plate or drum, and the resultant thin layer of the dope solution may be solidified by the above-mentioned means to produce a sheet or film of the polymer.

Alternatively, a polyphosphazene sheet or film can be produced by rolling, and a polyphosphazene cylinder or rod can be produced by injection molding.

The precursory shaped polyphosphazene article can be drawn or heat treated before the surface-treating procedure, without degrading the effect and advantage of the present invention.

The polyphosphazene polymer to be shaped into a precursory shaped article may have side chains which are reactive or capable of cross-linking, and during or after the shaping procedure, the polyphosphazene polymer molecules may be cross-linked with each other. The reactive side chains include those of the formulae:

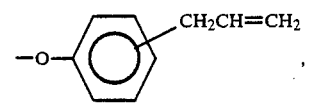

,

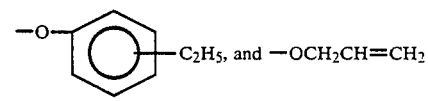

The cross-linkage can be formed in such a manner that the polyphosphazene polymer having the cross-linking side chains is mixed with a radical-generating agent, for example, a peroxide compound or a diazo compound, and the polyphosphazene polymer mixture is shaped into a precursory shaped article so that the polymer molecules are cross-linked with each other through the cross-linking side chains during the shaping procedure. Alternatively, the cross-linking reaction can be effected after the shaping procedure by a heat-treatment, electron beam-irradiation or light-irradiation applied to the precursory shaped article. The cross-linkage-generating means can be decided in view of the type of cross-linking side chains introduced into the polyphosphazene polymer.

The polyphosphazene polymer to be shaped may contain therein an additive consisting of at least one member selected from coloring materials, ultraviolet ray-absorbers, antistatic agents, anti-heat-deterioration agents, lubricants, and inorganic fillers. The amount of additive to be mixed with the polymer is not limited to a specific amount but is usually in an amount of 50% by weight or less.

In the process of the present invention, at least a portion of a surface portion of the precursory shaped article is modified by treating the portion with a surface treating agent consisting of at least one compound of the formula (II):

$$R^3OM \qquad (II)$$

wherein M represents a member selected from alkali metals, for example, Li, K and Na, and alkaline earth metals, for example, Mg and Ca, and $R^3$ represents a member selected from aliphatic, cycloaliphatic, and aromatic radicals which are different from $R^1$ and $R^2$ in the formula (I), to an extent such that at least 5 molar% of the first and second side chains $-OR^1$ and $-OR^2$ in the polymer in the above-mentioned portion are converted into at least one type of third side chains of the formula —OR³ different from the first and second side chains —OR¹ and —OR².

The third side chains represented by —OR³ are preferably selected from unsubstituted and substituted aliphatic radicals having 1 to 24 carbon atoms and unsubstituted and substituted aromatic radicals having 6 to 18 carbon atoms.

Preferably, the third side chains represented by —OR³ are selected from those of the formulae:

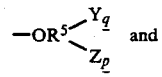 and

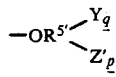

in which formulae $R^5$ represents a member selected from aliphatic and cycloaliphatic radicals having 1 to 15 carbon atoms, which optionally has at least one member selected from ether bond structures and double bond structures; $R^{5'}$ represents an aromatic hydrocarbon radicals having 6 to 22 carbon atoms, which optionally has at least one ether bond structure; Y represents a member selected from —CH₃ and —C₂H₅; Z represents a member selected from —OH, —COOH and

in which $R^6$ and $R^7$ respectively represents, independently from each other, a member selected from the group consisting of a hydrogen atom, alkyl radicals having 1 to 4 carbon atoms which optionally contain at least one hetero atom selected from oxygen and sulfur atoms and interposed between carbon atoms; Z' represents at least one member selected from the group consisting of —OH, —COOH,

in which $R^6$ and $R^7$ are as defined above, —CN, and halogen atoms; and p and q respectively represent, independently from each other, zero or an integer of 1 or 2.

The preferable third side chains represented by —OR³ are selected from those of the formulae:

—O—R⁵—OH, —O—R⁵′—OH,

—O—R⁵—COOH, —O—R⁵′—COOH,

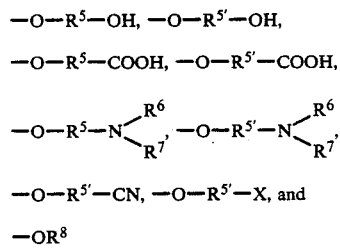

—O—R⁵′—CN, —O—R⁵′—X, and

—OR⁸ in which formulae $R^5$, $R^{5'}$, $R^6$, and $R^7$, are respectively as defined above, X represents a chlorine atom and $R^8$ represents a member selected from saturated and unsaturated aliphatic hydrocarbon radicals having 2 to 34 carbon atoms; radicals of the formulae:

—(CH₂)ᵢ—(B)—(D), —(C₃H₆B)ₖ—(D)

and (CH₂CH₂B)ⱼ—(D)

wherein B represents a divalent bonding member selected from oxygen and sulfur atoms, i represents an integer of 1 to 24, j represents an integer of 1 to 12, k represents an integer of 1 to 8, and D represents a member selected from alkyl radicals having 1 to 4 carbon atoms, benzyl radical, phenyl radical, phenyl alkyl radicals in which the alkyl radical has 1 to 4 carbon atoms; and radicals of the formula:

wherein $R^9$ represents a member selected from a hydrogen atom, primary alkyl radicals having 1 to 12 carbon atoms, secondary alkyl radicals having 3 to 14 carbon atoms, α,α-dimethyl alkyl radicals having 4 to 14 carbon atoms, and unsaturated organic radicals having 2 to 12 carbon atoms, for example, —CH₂CH=CH₂, which radicals represented by $R^9$ optionally contain at least one hetero atom selected from oxygen and sulfur atoms and interposed between carbon atoms.

In the formula

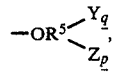

the $R^5$ may be a radical of the formula:

—(CHR¹⁰—CHR¹⁰—(B)_d)_q—(CH₂)—_e wherein $R^{10}$ represents a hydrogen atom or a —CH₃ radial q represents zero or an integer of 1 to 2, e represents zero or an integer of 1 or 2, and B and d are as defined above, respectively.

In the formula

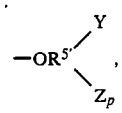

$R^{5'}$ may be a radical selected from those of the formulae:

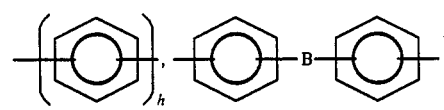

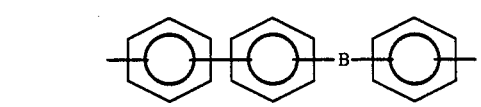

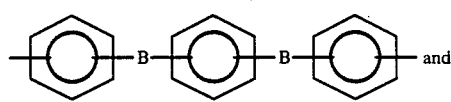

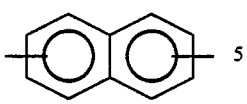

wherein B is as defined above, and h represents an integer of 1 to 3.

The examples of the typical third side chains of the formula

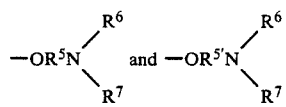

are those of the formulae:

—OCH$_2$CH$_2$NH$_2$,
—OC$_3$H$_6$NH$_2$,

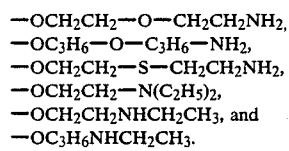

—OCH$_2$CH$_2$—O—CH$_2$CH$_2$NH$_2$,
—OC$_3$H$_6$—O—C$_3$H$_6$—NH$_2$,
—OCH$_2$CH$_2$—S—CH$_2$CH$_2$NH$_2$,
—OCH$_2$CH$_2$—N(C$_2$H$_5$)$_2$,
—OCH$_2$CH$_2$NHCH$_2$CH$_3$, and
—OC$_3$H$_6$NHCH$_2$CH$_3$.

The examples of the typical third side chains of the formulae —OR$^5$COOH, —OR$^{5'}$COOH, —OR$^5$OH, —OR$^{5'}$OH, —OR$^5$CN and —OR$^{5'}$X are those of the formulae:

—OCH$_2$COOH,

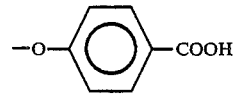

—O—CH$_2$CH$_2$OCH$_2$CH$_2$COOH
—O—C$_3$H$_6$OC$_3$H$_6$COOH,
—O—CH$_2$CH$_2$SCH$_2$CH$_2$COOH,
—O—CH$_2$CH$_2$OH
—O—C$_3$H$_6$OH,

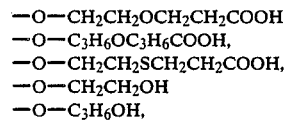

—O—CH$_2$CH$_2$OCH$_2$CH$_2$OH
—O—C$_3$H$_6$OC$_3$H$_6$OH,
—O—CH$_2$CH$_2$SCH$_2$CH$_2$OH,

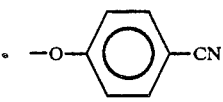

and

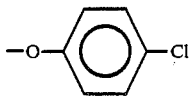

The examples of typical third side chains of the formula —OR$^9$ are those of the formulae:

—O—CH$_3$,
—CH$_2$CH$_3$,
—O—CH$_2$CH$_2$CH$_3$,
—O—CH(CH$_3$)$_2$,
—O—C(CH$_3$)$_3$,
—O—CH$_2$CH$_2$OCH$_3$,
—O—C$_3$H$_6$OCH$_3$,
—O—CH$_2$CH$_2$SCH$_3$,
—O—CH$_2$CH$_2$OCH$_2$CH$_2$OCH$_3$,
—OC$_3$H$_6$OC$_3$H$_6$OCH$_3$,
—OCH$_2$CH$_2$SCH$_2$CH$_2$SCH$_3$,
—O—CH$_2$CH$_2$O—CH$_2$—C(CH$_3$)$_3$,

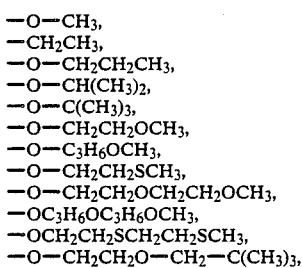

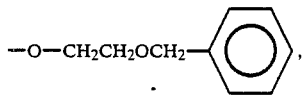

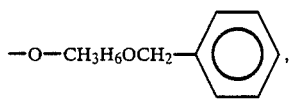

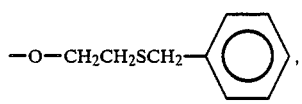

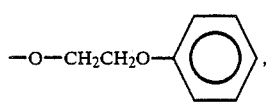

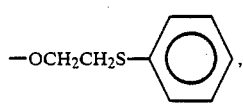

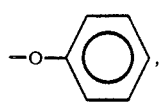

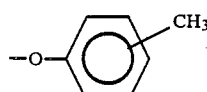

—O—CH$_2$CH=CH$_2$, and

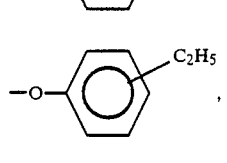

The preferable third side chains are of the formula:

—O—R$^5$—NH—R$^6$ or —OR$^{5'}$—NH—R$^6$ wherein $R^5$, $R^{5'}$ and $R^6$ are as defined above, for example, —OCH$_2$CH$_2$NH$_2$,

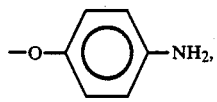

—OCH$_2$CH$_2$OCH$_2$CH$_2$NH$_2$, and
—OCH$_2$CH$_2$NHC$_2$H$_5$.

The type of the compound of the formula (II) can be decided in consideration of the specific property or performance to be imparted to the surface portion of the shaped article.

For example, where a water-repellent, oil-repellent property or a resistance to abrasion should be imparted, the compound of the formula (II) can be selected from salts of alkali metals and alkaline earth metals with fluorine-containing compounds, for example, those of the formulae, CF$_3$CH$_2$OH, CF$_3$CHOHCF$_3$, and C$_6$H$_5$OH. Alternatively, where a hydrophilic property should be imparted to the surface of the shaped article, the compounds of the formula (II) are preferably selected from salts of alkali metals and alkaline earth metals with ethylene glycol-condensates of the formula (HOCH$_2$CH$_2$O)$_n$—H, wherein n represents an integer of 2 or more, and mono-ethers of the ethylene glycol condensates. Further, where a lipophilic property should be imparted to the surface of the shaped article, the compounds of the formula (II) are preferably selected from salts of phenolic compounds, for example, of the formulae C$_6$H$_5$OH and CH$_3$C$_6$H$_4$OH, and alcoholic compounds, for example, of the formulae C$_2$H$_5$OH, C$_3$H$_7$OH and C$_4$H$_9$OH, with alkali metals and alkaline earth metals.

Furthermore, when it is intended to enhance the hardness of the surface of the shaped article, the compounds of the formula (II) are preferably selected from salts of unsaturated compounds, for example, of the formulae HOCH$_2$CH=CH$_2$ and CH$_2$=CH—C$_6$H$_4$—OH, with alkali metals and alkaline earth metals.

As stated above, the radical $R^3$ in the formula (II) is selected from unsubstituted and substituted aliphatic and aromatic radicals different from $R^1$ and $R^2$ in the formula (I).

The unsubstituted and substituted aliphatic radicals $R^3$ may be selected from those of the formulae:

—CH$_2$CH$_2$NH$_2$

—CH$_2$CH$_2$OH
—CH$_2$COOH and,

—CH$_2$CH$_2$CH$_3$.

Also, the unsubstituted and substituted aromatic radicals $R^3$ may be of the formulae:

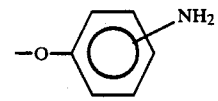

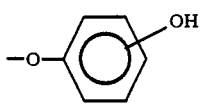

and,

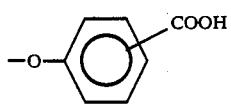

When the radical $R^3$ is an aliphatic radical, the metal M is preferably Na, and when the radical $R^3$ is an aromatic radical, the metal M is preferably Na or K.

In the surface treating step of the process of the present invention, the desired portion of the precursory shaped article is brought into contact with the surface treating agent consisting of at least one compound of the formula (II), which compound may be produced by reacting a precursory organic compound corresponding to the radical —OR$^3$, for example, alcohol compound, or phenol compound, with a precursory metal element or compound corresponding to the radical-M, for example, an oxide, hydrogenated compound or hydroxide of an alkali or alkaline earth metal, before or during the surface treating step.

Where the compound of the formula (II) is produced from the precursory organic compound and the precursory metal compound during the surface treating step, the precursory metal element or compound is used in an equivalent weight equal to or less than the equivalent weight of the precursory organic compound. If the precursory metal compound is used in an excessive amount, sometimes an undesirable side reaction occurs by which the backbone chains in the polyphosphazene polymer molecules are broken.

In the surface treating step, the surface treating agent may consist of a single compound of the formula (II) or a mixture of two or more compounds of the formula (II).

The type of the surface-treating compound of the formula (II) is decided in consideration of the type of the first and second side chains —OR$^1$ and —OR$^2$ in the polyphosphazene polymer in the precursory shaped article and the specific property or performance to be imparted to the shaped article.

Usually, it is preferable that in the polyphosphazene polymer, the radical $R^1$ and $R^2$ is aliphatic, and in the compound of the formula (II), the radical $R^3$ is aliphatic and the radical M is an alkali metal atom, more preferably, an Na atom.

In a preferable example, when the polyphosphazene polymer has the repeating units of the formula:

$$\begin{array}{c} \text{OCH}_2\text{CF}_3 \\ | \\ -\text{P}=\text{N}- \\ | \\ \text{OCH}_2\text{CF}_3 \end{array}$$

the surface treating agent consists of at least one member selected from the compounds of the formulae:

NaOCH$_2$CH$_2$NH$_2$, NaOCH$_2$CH$_2$OH, and
NaOCH$_2$CH$_2$COONa.

The surface treating step can be applied to the precursory shaped article at any stage after the precursory shaped article is formed. For example, where the precursory shaped article is in the form of a filament, wire or film, the surface treating step can be applied to the precursory filament wire or film just after the wire or film is formed, or after the wire or film is drawn, heat set or otherwise processed.

The surface treatment can be effected in the following various ways, depending on the type of the polyphosphazene polymer, the type of the surface treating agent, and the desired property to be imparted to the shaped article.

(A) A desired portion of the surface portion of the precursory shaped article is heat treated in a solution of the surface treating agent dissolved in an organic solvent which does not substantially dissolve therein or deform the precursory shaped article.

(B) The above-mentioned portion of the precursory shaped article is heat treated with a vapor of the surface treating agent, when the agent can be vaporized.

(C) The above-mentioned portion of the precursory shaped article is coated and then heat treated with a paint containing the surface treating agent.

(D) The above-mentioned portion of the precursory shaped article is coated with a paint containing the surface treating agent, and then the coated precursory shaped article is heat treated in an organic solvent which cannot dissolve or deform the precursory shaped article.

Preferably, the surface treatment of the precursory shaped article is carried out in an organic solvent which does not substantially dissolve or deform the precursory shaped polyphosphazene article, so that the conversion of the first and second side chains to the third side chains is effected only in the desired portion of the surface layer of the precursory shaped article without deformation or deterioration of the shaped article.

If the surface treating agent penetrates the core portion of the precursory shaped article, and the first and second side chains not only in the surface portion but also in the core portion of the precursory shaped article are converted into the third side chains, and the resultant shaped article may sometimes exhibit an unsatisfactory mechanical property or may have undesirably changed dimensions.

Typically, a precursory article is coated with or immersed in a mixture of a precursory alkali metal compound with a precursory alcohol compound, and, optionally, a solvent, in a predetermined proportion thereof, is optionally immersed in a solvent, and is then heat treated at a temperature of from 0° C. to 150° C. for one minute to 40 hours. The surface treating compound is used in a molar amount of 1 to $10^5$ times the molar amount of the first and second side chains to be converted, in consideration of the reaction conditions and reactivity of the surface treating compound used. If effective, the surface treating agent mixture contains phase transfer catalyst, for example, quaternary ammonium salts (($C_4H_9$)$_4$NBr and ($C_4H_9$)$_4$NCl), and quaternary phosphonium salts (($C_4H_9$)$_4$PBr and ($C_4H_9$)$_4$PCl).

In a typical example, a surface of a precursory shaped polyphosphazene article, for example, a film is coated with a mixture of 2 molar parts of 2-aminoethanol with one molar part of metallic sodium, and the coated precursory shaped article is immersed in a solution of 0.154 molar parts of tetrabutyl ammonium bromide dissolved in a solvent consisting of diethylether and n-heptane in a mixture weight ratio of 1:1 and treated at a temperature of 40° C. for 4 hours.

The solvent consists of one or more liquid compounds which cannot dissolve or deform the precursory shaped polyphosphazene article. The solvent usable for the process of the present invention preferably consists of at least one member selected from the group consisting of:

(i) aliphatic straight chain hydrocarbons, for example, n-pentane, n-hexane and n-heptane;

(ii) Aromatic hydrocarbones, for example, benzene, toluene and xylene;

(iii) mixtures of at least one non-protonic polar organic compound with at least one non-polar organic compound, for example, mixtures of n-hexane with diethylether (mixing volume ratio 1:1), n-heptane with diethylether (1:1), n-heptane with diethylene glycoldimethylether (3:2), n-heptane with dioxane (3:2), n-heptane with N-methylpyrrolidone (20:1), n-heptane with dimethylformamide (20:1), n-heptane with dimethylsulfoxide (20:1), and n-heptane with hexamethylenesphosphoramide (20:1);

(iv) halogenated hydrocarbons, for example, dichloromethane ($CH_2Cl_2$) and trichloromethane ($CHCl_3$);

(v) mixtures of at least one halogenated hydrocarbon with at least one non-polar compound, for example, mixtures of tetrachloroethane ($CHCl_2-CHCl_2$) with n-heptane (a mixing volume ratio: 2:5) and tetrachloroethane with n-hexane (2:5); and (vi) mixtures of at least one non-protonic polar compound with at least one halogenated hydrocarbon, for example, mixtures of N-methylpyrrolidone with dichloromethane (1:20), hexamethylphosphoramide with dichloromethane (1:20), dimethylsulfoxide with dichloromethane (1:20), and dimethylformamide with dichloromethane (1:20).

When the third side chains introduced into the polyphosphazene polymer have functional radicals $R^3$, for example, amino, hydroxyl, carbonyl or glycol-substituted carbonyl, which are reactive, the third side chains may be converted or extended into another type of side chains (fourth side chains) which can impart another property or function to the shaped article.

In the shaped polyphosphazene article of the present invention, preferably, the third chains $—OR^3$ are formed in a degree of conversion (T) of 20 molar% or less based on the entire molar amount of the side chains $—OR^1$, $—OR^2$ and $—OR^3$ in the entire article, and are formed in a degree of conversion (S) of 50 molar% or more based on the total molar amount of the side chains $—OR^1$, $—OR^2$ and $—OR^3$ in the surface portion of the article, and the S/T ratio is 2.0 or more.

The thickness of the surface portion of the shaped polyphosphazene article in which portion the third side chains are introduced, can be determined, for example, by the method as described in detail by Iwamoto, in the "Journal of The Nippon Rubber Association", Vol. 58, No. 10, page 634.

In this method, the thickness is determined by transmitting light into the surface portion by the ATR method using an FT-IR spectrometer with a KRS-5 prism at an angle of incidence of 45 degrees.

Alternatively, the thickness of the modified surface portion of the shaped polyphoshazene article can be determined by dyeing the portion with a specific dyestuff and by measuring the thickness of the resultant colored layer by means of an electron microscope.

Otherwise the thickness of the modified surface portion can be determined by means of an ESCA.

Usually, it is preferable that the modified surface portion have a thickness of 10 angstroms or more, more preferably, $10^2$ angstroms or more, still more preferably from $10^2$ to $10^5$ angstroms.

The surface properties and functions of the shaped, modified polyphosphazene article are determined in the following ways.

(i) Measurement of angle of contact with the surface of the article, of a water drop having a predetermined volume.

(ii) Measurement of pH of the surface of the shaped article, when side chains having a certain type of radicals, for example, $-NH_2$ or $-COOH$, which changes the pH of the surface are introduced.

In the shaped article of the present invention, typically only the surface portion of the precursory shaped article is entirely or partially modified. If it is necessary to modify not only the surface portion but also the core portion of the precursory shaped article, the precursory shaped article is treated with the surface treating agent in the presence of a carrier which can carry the surface treating agent into the core portion without dissolving or deforming the precursory shaped article.

The carrier may be a mixture of at least one liquid which cannot dissolve the precursory shaped article and at least the other liquid which can dissolve or cause swelling of the precursory shaped article.

For example, the precursory shaped article is heat treated in a solution of the surface treating agent consisting of at least one compound of the formula (II) dissolved in a mixture of several % to several tens % of the above-mentioned dissolving or swelling liquid with the balance of the above-mentioned non-dissolving liquid.

In another example, the precursory shaped article is heat treated in a solution of the surface treating agent dissolved in a liquid which can cause a swelling of but cannot dissolve the precursory shaped article.

By the surface-treating step in the process of the present invention, the first and second side chains $-OR^1$ and $-OR^2$ in the polymer in the treated portion of the precursory shaped article are entirely or partially converted to the third side chains $-OR^3$, and the treated portion gains a specific property or performance corresponding to the type and amount of the third side chains $-OR^3$.

Where the treatment with the compound of the formula (II) is effected only on the surface portion of the precursory shaped portion, the original chemical, physical and/or mechanical properties and performances of the core portion are unchanged, and the surface portion thereof exhibits a specific surface property and performance which are different from those of the core portion.

The shaped polyphosphazene article can be utilized in various industrial fields, for example, semipermeable membranes, medical products, electrical products, electronic products, chemical products, in which the article is used under very strict conditions, in accordance with the specific property and performance thereof.

For example, the shaped polyphosphazene articles having the third side chains of the formulae:

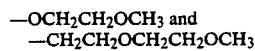

can be used as solid polymeric electrolylic materials and are useful for the electrical industry. Other shaped polyphosphazene articles having the third side chains containing an amino group, for example, of the formula $-OCH_2CH_2NH_2$ can be used to fix thereon bioactive compounds, and are useful for the medical and chemical industries. Still other shaped polyphosphazene articles containing the third side chains of the formula

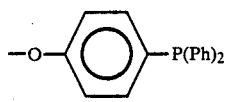

can be used to fix thereon metallic ions to produce a certain type of catalyst and are useful for the chemical industry. Furthermore, many different types of shaped polyphosphazene articles can be utilized as gas-separating membranes.

SPECIFIC EXAMPLES

The present invention will be further illustrated by the following examples, which are intended to be representative rather than restrictive of the scope of the present invention.

In the examples, the degree of conversion of the first and second side chains $-OR^1$ and $-OR^2$ in the starting polymer to the third side chains $-OR^3$ is determined by measuring the amount of hydroxide substance produced by separating the first and second side chains from the starting polymer and by protonizing the separated side chain radicals, by gas chromatography, or by measuring the molar ratio of the first and second side chains in the starting polymer to the third side chains in the modified polymer by NMR.

EXAMPLE 1

A dope solution was prepared by dissolving poly(bis-trifluoroethoxyphosphazene) having an intrinsic viscosity of 1.06 determined at a concentration of 0.5 g/100 ml in acetone at a temperature of 25° C., in tetrahydrofuran at a polymer concentration of 10%.

The dope solution was spread on a horizontal surface of a glass plate, the resultant layer of the dope solution was solidified by evaporating acetone solvent, and the resultant polymer film was peeled from the glass plate. The polymer film was drawn in one direction at a temperature of 60° C. and a draw ratio of 3.5. The drawn polymer film had a thickness of 50 μm and exhibited a tensile strength of 1.2 kg/mm² and an ultimate elongation of 47% in the drawing direction.

A treating liquid was prepared by dissolving 10% by weight of a mixture consisting of one molar part of diethyleneglycol monomethylether and 0.8 molar parts of metallic sodium in a mixed solvent consisting of dioxane and toluene in a mixing volume ratio of 1:1.

The drawin poly(bis-trifluoroethoxyphosphazene) film was treated in the treating liquid at a temperature of 60° C. for one hour. The treated polymer film was washed with water to completely remove the treating liquid and the washed polymer film was dried.

The resultant modified polymer film exhibited a tensile strength of 1.0 kg/mm² and ultimate elongation of 54%, which are on a similar level to those of the drawn polymer film.

Also, it was confirmed by differential thermal calorimeter that the transition point temperature of the modified polymer film was similar to that of the drawn polymer film.

However, when a water drop having a volume of 10 µl was placed on the modified polymer film surface, the contact angle of the water drop was 49 degrees, but the content angle of the water drop on the drawn polymer film surface was 100 degrees. That is, it was clear that the modified polymer film surface exhibited a greatly enhanced hydrophilic property.

EXAMPLE 2

A sodium alcoholate solution was prepared by reacting 2.03 g of 2-aminoethanol with 0.38 g of metallic sodium in 40 ml of a solvent consisting of tetrahydrofuran (THF).

Thereafter, the solvent THF in the sodium alcoholate solution was replaced by a mixed solvent consisting of diethylether and n-heptane in a mixing volume ratio of 1:1. The resultant sodium alcoholate solution was mixed with 0.41 g of n-tetrabutylammonium bromide to provide a treating mixture.

A starting poly-bis(2,2,2-trifluoroethoxyphosphazene) film having a thickness of 490 µm in an amount of 2 g, which film was prepared in the same manner as that described in Example 1, was immersed in the treating mixture and was left therein at room temperature for 8 hours and then at a temperature of 40° C. for 6 hours, while the treating mixture was stirred. The polymer film was removed from the treating mixture, washed with methyl alcohol, and dried.

The resultant modified polymer film had a thickness of 490 µm and exhibited a tensile strength of 1.2 kg/mm$^2$ and an ultimate elongation of 4%.

The contact angle of a water drop on the starting polymer film was 93 degrees, whereas the contact angle of a water drop on the treated polymer film was 60 degrees after treatment at room temperature for 8 hours and 19 degrees after further treatment at a temperature of 40° C. for 6 hours.

That is, it is clear that the above-mentioned surface treatment was remarkably effective for enhancing the hydrophilic property of the polymer film.

Also, it was confirmed by an FT-IR spectrometer that the modified polymer film surface exhibited a characteristic light absorption at a wave length of 1580 cm$^{-1}$, which corresponds to an amino radical.

Furthermore, it was determined that the 2,2,2-trifluoroethoxy side chains in the starting polymer were converted in a degree of conversion (T) of 11 molar% based on the total molar amount of the above-mentioned side chains in the entire starting film, which was determined by measuring the amount of trifluoroethanol separated from the starting polymer by gas chromatography, and in a degree of conversion (S) of 83 molar% based on the total molar amount of the above-mentioned side chains in the surface portion of the starting film determined by the afore-described ATR method using an FT-IR spectrometer with a KRS-5 prism at an angle of incidence of 45 degrees. The S/T ratio was 7.5:1.

EXAMPLE 3

A starting polymer having a thickness of 430 µm was prepared from polyphenoxyphosphazene in the same manner as that described in Example 1.

Separately, a sodium alcoholate solution was prepared by reacting 2-aminoethanol with metallic sodium in an amount of 0.5 times the molar amount of the 2-aminoethanol in a solvent consisting of THF. After a portion of the THF solvent was evaporated, the resultant paste was applied onto a surface of the polymer film, and the resultant coated polymer film was dried. The dried polymer film was immersed in a liquid medium consisting of a mixture of diethylether and n-heptane in a mixing volume ratio of 1:1 and 0.1% by weight of n-tetrabutyl ammonium bromide and was heated at a boiling point temperature of the liquid medium for 8 hours while refluxing. The treated polymer film was washed with methyl alcohol and dried. The dried polymer film had a tensile strength of 0.9 kg/mm$^2$, an ultimate elongation of 38% and a water drop contact angle of 48 degrees, whereas the starting polymer film had a tensile strength of 0.9 kg/mm$^2$, and a water drop contact angle of 98 degrees.

That is, the modified polymer film exhibited similar mechanical properties to those of the starting polymer film and had a greatly enhanced hydrophilic property.

EXAMPLE 4

The same treating dispersion as that described in Example 2 was used, except that the 2-aminoethanol was replaced by 4-aminophenol, the metallic sodium was used in an amount of 0.5 times the molar amount of 4-aminoethanol, and n-tetrabutylammonium bromide was used in an amount of 0.1% by weight.

The same starting polydiphenoxyphosphazene film as that described in Example 3 was immersed and heated in the treating dispersion for 8 hours while refluxing.

The resultant modified polymer film exhibited a tensile strength of 0.9 kg/mm$^2$, an ultimate elongation of 38%, and a water drop contact angle of 74 degrees, whereas the starting polymer film exhibited a tensile strength of 0.9 kg/mm$^2$, an ultimate elongation of 39% and a water drop contact angle of 98 degrees.

That is, the modified polymer film surface exhibited a remarkably enhanced hydrophilic property.

EXAMPLE 5

A treating dispersion was prepared in the same manner as that described in Example 4.

The same starting poly(bis-trifluoroethoxyphosphazene) film as that described in Example 1 was immersed and heated in the treating dispersion for 8 hours while refluxing.

The resultant modified polymer film exhibited a water drop contact angle of 72 degrees, whereas that of the starting polymer film was 100 degrees. That is, the hydrophilic property of the polymer film surface was remarkably improved.

EXAMPLE 6

A starting polymer sheet having a thickness of 1 mm was prepared from a polymeric composition of a polyphosphazene copolymer, in which the side chains thereof consisted of 64 molar% of trifluoroethoxy radicals, 35 molar% of octafluoropentoxy radicals, and 1 molar% of allyloxy radicals, and which had an intrinsic viscosity of 2.17 determined at a concentration of 0.5 g/100 ml in tetrahydrofuran at a temperature of 25° C., with 2% by weight of cumene peroxide, by compression molding at a temperature of 155° C. for 30 minutes.

The polymer sheet was surface treated in the same treating liquid at that described in Example 1 at a temperature of 80° C. for one hour.

The surface of the resultant modified polymer sheet exhibited a water drop contact angle of 51 degrees, whereas the surface of the starting sheet exhibited a water drop contact angle of 102 degrees.

That is, the modified polymer sheet had an enhanced hydrophilic surface property.

EXAMPLE 7

A starting polymer monofilament having a diameter of 1 mm was produced from a polyphosphazene copolymer, in which the side chains thereof consisted of 50 molar% of phenoxy radicals and 50 molar% of p-ethylphenoxy radicals and which had an intrinsic viscosity of 2.04 determined at a concentration of 0.5 g/100 ml in THF at a temperature of 25° C., by an extrusion process.

The starting monofilament was surface treated in a treating liquid comprising 5% by weight of 2,2,2-trifluoroethanol and metallic sodium in an amount of 0.8 molar times that of the trifluoroethanol, dissolved in a mixed solvent consisting of dioxane and n-hexane in a mixing weight ratio of 2:1, at a temperature of 50° C. for 2 hours.

The resultant modified monofilament had a tensile strength of 0.84 kg/mm² and an ultimate elongation of 270%, which were similar to those of the starting monofilament.

The periphery of the resultant modified monofilament repelled gasoline, whereas the periphery of the starting monofilament was easily wetted by gasoline. That is, the modified monofilament periphery was oil repellent while the starting monofilament periphery was lipophilic.

Also, the modified monofilament exhibited an enhanced abrasion resistance.

EXAMPLE 8

The same procedures as those described in Example 3 were carried out except that the polydiphenoxyphosphazene film was replaced by a poly(bis-2,2,2-trifluoroethoxyphosphazene) monofilament having a diameter of 0.3 mm, a tensile strength of 0.7 g/d, and an ultimate elongation of 39%, and the surface treatment was carried out for 6 hours with refluxing.

In an FT-IR measurement on the filament surface, the modified filament surface portion exhibited a light absorption corresponding to amino radicals introduced into the side chains, and had an enhanced hydrophilic property.

EXAMPLE 9

The same procedures as those described in Example 8 were carried out except that the starting poly(bis-2,2,2-trifluoroethoxyphosphazene) monofilament had a diameter of 0.3 mm, a tensile strength of 0.68 g/d, and an ultimate elongation of 36%, and the monofilament coated with the sodium alcoholate paste was heated in air atmosphere at a temperature of 50° C. for 5 hours. The modified filament was cooled, washed with methyl alcohol, and dried.

The modified filament surface exhibited a light absorption corresponding to an amino radical and an enhanced hydrophilic property.

EXAMPLE 10

A polymer monofilament was prepared by extruding a dope solution containing 50% by weight of a poly(bis-trifluoroethoxyphosphazene) having an intrinsic viscosity of 0.52 determined at a concentration of 0.5 g/100 ml in acetone at a temperature of 25° C., into a coagulating water bath through a spinning nozzle having an inside diameter of 0.5 mm, by withdrawing the coagulated filament from the coagulating water bath and by drying the filament.

The resultant filament was drawn at a draw ratio of 5.0 at a temperature of 60° C., and was heat-set at a temperature of 150° C. for 30 seconds. The resultant starting polymer filament had a denier of 150.

The starting polymer filament was immersed and heated in a solution of 5% by weight of a mixture of phenol and sodium hydroxide in a mixing molar ratio of 1:0.8 in a mixed solvent consisting of methyl alcohol and toluene in an mixing weight ratio of 1:1, at a temperature of 60° C. for 30 minutes.

The resultant modified polymer filament had degrees of conversion (S) and (T) of the side chains in the starting polymer of 18 molar% and 2.9 molar%, respectively and an S/T ratio of 6.2:1, determined by NMR.

EXAMPLE 11

A starting polymer monofilament having a diameter of 1 mm was produced from a polyphosphazene copolymer in which the side chains thereof consisted of 50 molar% of phenoxy radicals and 50 molar% of p-ethylphenoxy radicals, by a melt extrusion at a temperature of 150° C., and which had an intrinsic viscosity of 2.06 determined at a concentration of 0.5 g/100 ml in THF at a temperature of 25° C.

The starting polymer filament was immersed and heat treated in a solution of a mixture of 10% by weight of 3,4-dichlorophenol with sodium hydroxide in an amount 0.9 times that of the molar amount of the 3,4-dichlorophenol, in ethyl alcohol at a temperature of 60° C. for b 2 hours.

The resultant modified polymer monofilament exhibited in LOI of 54, a degree of conversion S of 81 molar% and a conversion degree S/T ratio of 6.5:1.

We claim:

1. A shaped polyphosphazene article comprising a polyphosphazene polymer having at least one type of repeating units of the formula

wherein $R^1$ and $R^2$ in the first and second side chains —$OR^1$ and $OR^2$ respectively represent, independently from each other, a member selected from aliphatic, cycloaliphatic and aromatic radicals; whereon on at least a portion of the surface of the article, the first and second side chains —$OR^1$ and —$OR^2$ in the polyphosphazene polymer located in the above-mentioned portion are converted, to an extent of at least 5 molar% thereof, to at least one type of third side chains of the formula —$OR^3$ in which $R^3$ represents a member selected from aliphatic, cycloaliphatic and aromatic radicals and which are different from the first and second side chains —$OR^1$ and —$OR^2$; and wherein only the surface portion of the shaped article is modified.

2. The shaped article as claimed in claim 1, wherein the third side chains —$OR^3$ are formed in a degree of conversion (T) of 20 molar% or less based on the entire molar amount of the side chains —$OR^1$, —$OR^2$ and —$OR^2$ in the entire article, and are in a degree of conversion (S) of 5 molar% or more based on the total molar amount of the side chains —OR$^1$, —OR$^2$ and —OR$^3$ in the surface portion of the article, and the S/T ratio is 2.0 or more.

3. The shaped article as claimed in claim 1, which is in the form of a film.

4. The shaped article as claimed in claim 1, which is in the form of a wire or filament.

5. The shaped article as claimed in claim 1, wherein in the formula (I), R$^1$ and R$^2$ respectively represent independently from each other, a member selected from the group consisting of:

(i) aliphatic and cycloaliphatic hydrocarbon radicals having 1 to 12 carbon atoms, which may be substituted by at least one fluorine atom; and (ii) unsubstituted or substituted aromatic hydrocarbon radicals of the formulae:

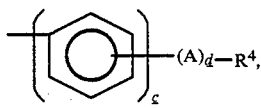

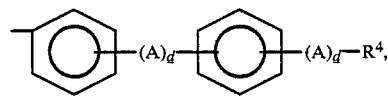

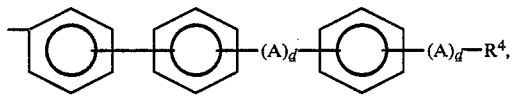

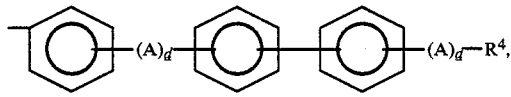

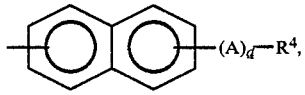

and

—(CH$_2$)$_e$—(A)$_d$—(Ar')—(A)$_d$—R$^4$ wherein R$^4$ represents a member selected from the group consisting of a hydrogen atom, halogen atoms, —CN radical, primary alkyl radicals having 1 to 12 carbon atoms, secondary alkyl radicals having 3 to 14 carbon atoms, α,α-dimethyl alkyl radicals having 4 to 14 carbon atoms, and unsaturated aliphatic hydrocarbon radicals having 2 to 6 carbon atoms, which radicals may contain at least one hetero atom selected from oxygen and sulfur atoms; Ar' represents a member selected from aromatic radicals of the formulae:

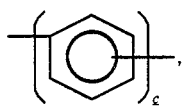

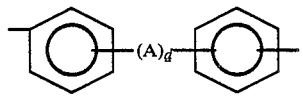

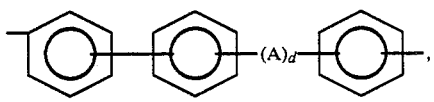

and

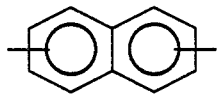

A represents a member selected from oxygen and sulfur atoms; d represents zero or an integer of one; c represents an integar of 1 to 3; e represetns an integer of 1 to 4, and in the group represented by —(A)$_d$—R$^4$ in the above-indicated formulae, R$^4$ may be —CN or a halogen atom only when d is zero.

6. The shaped article as claimed in claim 1, wherein the third side chains represented by —OR$^3$ are selected from those of the formulae:

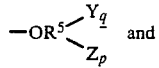 and

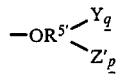

in which formulae R$^5$ represents a member selected from aliphatic and cycloaliphatic radicals having 1 to 15 carbon atoms, which may have at least one member selected from ether bond structures and double bond structures; R$^{5'}$ represents an aromatic hydrocarbon radicals having 6 to 22 carbon atoms, which may have at least one ether bond structure; Y represents a member selected from —CH$_3$ and —CH$_2$H$_5$; Z represents a member selected from —OH, —COOH and

in which R$^6$ and R$^7$ respectively represents, independently from each other, a member selected from the group consisting of a hydrogen atom, alkyl radicals having 1 to 4 carbon atoms which may contain at least one hetero atom selected from oxygen and sulfur atoms and interposed between carbon atoms; Z' represents at least one member selected from the group consisting of —OH, —COOH,

in which R$^6$ and R$^7$ are as defined above, —CN, and halogen atoms; and p and q respectively represent, independently from each other, zero or an integer of 1 or 2.

7. The shaped article as claimed in claim 1, wherein the third side chains represented by —OR$^3$ are selected from those of the formulae:

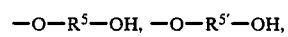

-continued

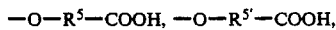

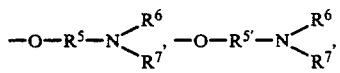

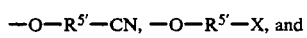

—OR$^8$ in which formulae R$^5$, R$^{5'}$, R$^6$, and R$^7$ are respectively as defined above, X represents a chlorine atom and R$^8$ represents a member selected from saturated and unsaturated aliphatic hydrocarbon radicals having 2 to 34 carbon atoms, radicals of the formulae:

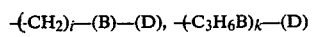

and

wherein B represents a divalent bonding member selected from oxygen and sulfur atoms, i represents an integer of 1 to 24, j represents an integer of 1 to 12, k represents an integer of 1 to 8 and D represents a member selected from alkyl radicals having 1 to 4 carbon atoms, benzyl radical, phenyl radical, phenylalkyl radical in which the alkyl radical has 1 to 4 carbon atoms; and radicals of the formula:

wherein R$^9$ represents a member selected from a hydrogen atom, primary alkyl radicals having 1 to 12 carbon atoms, secondary alkyl radicals having 3 to 13 carbon atoms, α,α-dimethyl alkyl radicals having 4 to 14 carbon atoms, and unsaturated organic radicals having 2 to 12 carbon atoms, which radicals represented by R$^9$ may contain at least one hetero atom selected from oxygen and sulfur atoms and interposed between carbon atoms.

8. The shaped article as claimed in claim 7 wherein the third side chains represented by

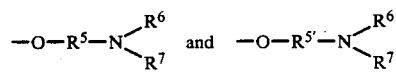

are selected from those of the formulae:

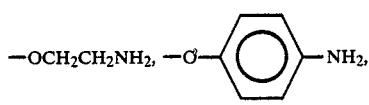

and —OCH$_2$CH$_2$NHCH$_2$CH$_3$.

9. The shaped article as claimed in claim 7, wherein the third side chains represented by —OR$^5$COOH, —OR$^5$OH, —OR$^5$CN and ——OR$^{5'}$X are selected from those of the formulae:

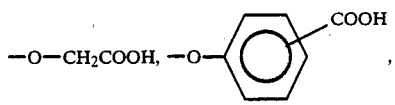

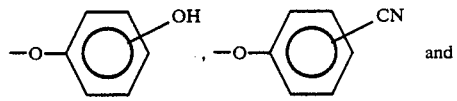

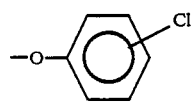

10. The shaped article as claimed in claim 7, wherein the third side chains represented by —OR$^8$ are selected from those of the formulae:

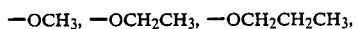

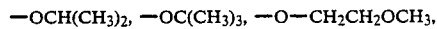

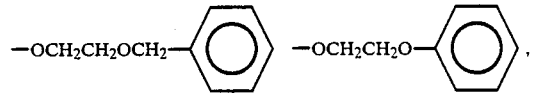

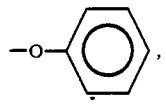

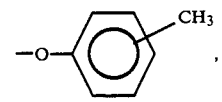

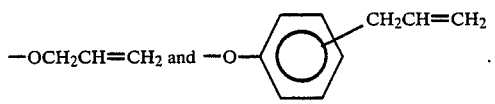

11. The shaped article as claimed in claim 1, wherein the repeating units of the formula (I) in the polyphosphazene polymer are in a molar amount of 50% or more.

12. The shaped article as claimed in claim 1, wherein the surface portion has a thickness of at least 10 angstroms.

* * * * *